Oct. 12, 1965

E. REED 2ND 3,211,199

BIT END OF TOOL FOR DRIVING SCREW FASTENERS

Filed Oct. 9, 1963

INVENTOR
EDGAR REED, 2nd

BY Scrivener & Parker

ATTORNEYS

United States Patent Office 3,211,199
Patented Oct. 12, 1965

3,211,199
BIT END OF TOOL FOR DRIVING SCREW
FASTENERS
Edgar Reed 2d, 24 Butternut Hill Road,
Worcester, Mass.
Filed Oct. 9, 1963, Ser. No. 314,950
1 Claim. (Cl. 145—50)

This invention relates to tools for turning a threaded fastener such as a screw to drive it into wood, metal or other material in its normal and intended use.

All screw fasteners of the type with which the tool provided by this invention is to be used comprise a threaded shank having a head which is provided in its upper surface with a slot or recess to receive a tool by which the fastener is turned about its axis. The shank and thread of such a fastener may have any shape or construction, the head may be flat, round, oval or any other desired type or shape, and the tool receiving recess may be of any desired type, such as the well-known diametrical slot or the Reed & Prince (or Frearson) recess or the Phillips recess. These parts of a known and conventional screw are not modified or changed in any way by this invention.

When a screw having a slotted or recessed head is to be turned in order to drive it into some material, the bit end of the driving tool is inserted into the slot or recess in the head in order to provide a driving connection between the tool and the fastener. As the threaded shank of the fastener increases its penetration of the material into which the fastener is being driven, the torque applied to the walls of the slot or recess in the head increases greatly, and the reaction of these walls on the tool tends to force the tool out of the slot or recess. This is a very common phenomenon and when it occurs the tool is said to "back off" from the slot or recess in the head. This backing off causes damage to the tool and to the walls of the slot or recess in the head and also requires that additional force be exerted on the tool in a direction toward the head in order to insure that the tool and screw will not be separated and that sufficient driving torque will be imparted to the fastener by the tool.

This invention has for its principal object the provision of a driving tool having a bit end for insertion into the slot or recess in the head of a screw fastener to impart turning movement thereto, which bit end is so constructed that it provides maximum resistance to forces tending to force it from the slot or recess in the screw fastener head, thus eliminating backing off or reducing it to a minimum.

The invention is described in this specification as applied to, and in the construction of, a driving tool for a recess head screw having a four-arm recess, but it will be understood that this description is only for purposes of illustration and that the invention is equally useful in the manufacture and construction of a driving tool for a slotted head, three-arm recess, or other type of screw head recess.

The invention is described in the accompanying drawings in which.

Figure 1:
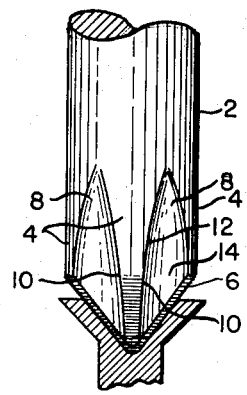
FIG. 1 is a side elevational view of the bit end of a tool for driving a threaded fastener, the tool being shown in driving engagement with the fastener before any treatment in accordance with this invention.

A tool for turning a screw fastener is illustrated in the drawings and comprises an elongated shank 2 which may be part of a hand-operated or a power-operated turning tool. The driving or bit end of the tool is provided with four vanes 4 which are equally spaced about the axis of the shank and the outer surfaces of which converge toward the tip end of the shank, as shown at 6. The side faces 8, 10 of each vane are either parallel to each other or converge slightly toward the tip end of the tool and are equally spaced on opposite sides of a radius of the shank, the radii bisecting opposite vanes constituting a diametrical line through the axis of the shank. Thus, adjacent faces of adjacent vanes, such as those indicated at 12, 14, are approximately normal to each other. Such a bit end of a driving tool will be accommodated in the driving recess in the head of a Reed & Prince (Frearson) or Phillips screw, although the shapes of these two types of recess are different and the bit end must be modified accordingly. This, however, does not affect the invention in any way.

Figure 2:
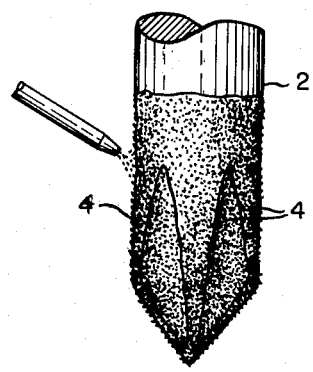
FIG. 2 is a side elevational view of the bit end of the tool shown in FIG. 1, after abrasive blasting, which is the first step of the preferred method according to the invention.

A bit end according to the present invention is first formed to the desired shape, for example as described above and as illustrated in FIG. 1, and is then subjected to "abrasive blasting" as shown in FIG. 2, which consists in shooting a cloud of jagged, abrasive metallic particles of different sizes at the bit end, producing a roughened surface which is of low height with respect to the diameter of the bit end, and which, under microscopic examination, appears as a field of spear-like protuberances extending outwardly in all directions. The abrasive blasting increases the hardness of the surface zone by about 1½ points on the Rockwell C scale and, in addition, the abrasive enters the surface by removing metal, thus producing a very jagged surface structure. The abrasive is propelled at high speed onto the bit, which may be done by subjecting it to a blast of air at approximately 100 p.s.i. through a 1-inch pipe. The process is similar to the well-known process of shot peening or shot-blasting, but utilizes jagged metal particles of very small size instead of the spherical balls used in shot peening.

If desired, and further in accordance with the invention, the surface characteristics of the finished bit end may be varied by mixing a liquid such as water with the jagged metallic particles which are blasted onto the bit. The water takes the place of some of the abrasive material and causes the resulting blasted pattern to be spread out or condensed depending on the ratio of liquid to particles in the mixture, by which it is meant that the number of jagged protuberances per unit of area of blasted surface is decreased or increased. This cntrol over the character of the surface of the bit end is important for the following reasons.

A hand tool, such as a screwdriver, requires a bit end having a surface structure different from that of a power driving tool, the reason being that the power driver produces more torque, accelerates faster and stops more suddenly than a hand driver and therefore grips the screw head recess more tightly than does a hand driver. In distinction, a hand driving tool is turned slowly and at varying angles to the axis of the screw, this latter being due to the articulation of the wrist and arm of the person turning the driver. I have found that best results are obtained by treating the bit end of a hand driver with jagged abrasive metallic particles of larger average size and treating the bit end of a power driving tool with abrasive particles of smaller average size. The larger particles produce a rougher, deeper, more pronounced surface than do the smaller particles.

The same, or a similar, result may be obtained by mixing liquid with the abrasive material as described above, the roughness of the surface being approximately inversely proportional to the amount of liquid used.

Figure 3:
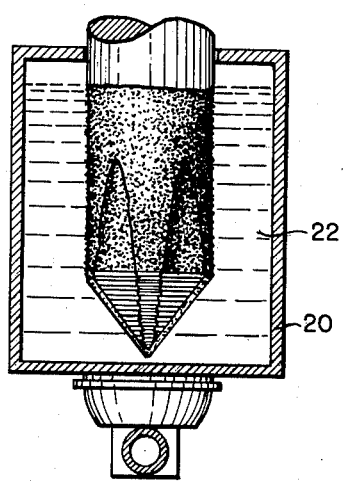
FIG. 3 is a view illustrating the next step in the preferred method, this being the heat treatment of the bit end after abrasive blasting.
Figure 4:
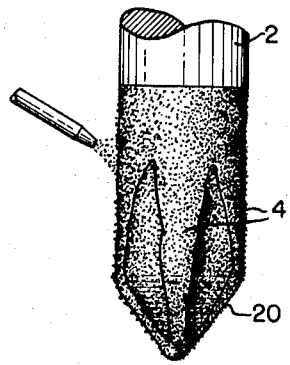
FIG. 4 is a view showing the bit end of the tool after the next step in the preferred method, which is the second abrasive blasting.

After abrasive blasting, and in the preferred practice of the invention, the entire bit end of the tool is heat treated, as indicated in FIG. 3 of the drawings. As an example, this heat treatment may be carried out in a gas fired pot furnace 20 by heating the entire tool in a neutral salt 22 which does not produce scale and which may be Houghton Liquid Heat 1145. The heating may be continued for five minutes at 1630° F. to produce good results and the bit end is then cooled by quenching in oil at 75° F. to 140° F. The roughness produced by abrasive blasting is retained after heating in a neutral salt which does not produce scale. If scale was produced the roughness of the bit end would flake off with the scale.

Following the heat treatment, and in the preferred practice of the invention, the bit end is again subjected to abrasive blasting. This step increases the hardness of the outer surface by about 1½ points on the Rockwell C scale, thus increasing wear resistance without increasing brittleness, which would be increased if the hardness of the core of the bit was equally increased. In other words, the treatment increases the hardness of the surface layer while retaining the toughness of the core.

The steps of abrasive blasting before and after heat treatment constitute two cold forging operations because in both abrasive blasting steps the surface metal of the bit end is moved and worked, producing a rough surface before heat treatment and a rough surface with increased hardness after heat treatment.

While certain embodiments of my invention and certain ways in which it is intended to be performed have been described and illustrated, it will be apparent to those skilled in the arts to which it relates that other embodiments and method steps, as well as modifications of those disclosed, may be made and practiced without departing in any way from the spirit or scope of the invention, for the limits of which reference must be made to the appended claim.

What is claimed is:

A bit end for a tool for turning a threaded fastener, said bit end being blasted with small jagged metallic particles to provide an exterior surface substantially covered by spaced outwardly extending spear-like protuberances of low height with respect to the diameter of the bit end, such protuberances having an irregular pattern providing a roughened gripping surface highly resistive to relative axial "backing out" movement of the bit end with respect to the fastener as the tool is turned.

References Cited by the Examiner

UNITED STATES PATENTS

| | | | |
|---|---|---|---|
| 1,899,489 | 2/33 | Wickbergh. | |
| 2,116,775 | 5/38 | Blackburn. | |
| 2,231,009 | 2/41 | Holt | 148—15 |
| 2,328,869 | 9/43 | Wilkie | 51—318 |
| 2,380,385 | 7/45 | Buffum | 148—15 |
| 3,093,172 | 6/63 | Reed | 145—61 |
| 3,133,568 | 5/64 | Reed | 145—50 |

WILLIAM FELDMAN, *Primary Examiner.*

M. HENSON WOOD, JR., *Examiner.*